United States Patent [19]

Juntgen et al.

[11] 3,960,529

[45] June 1, 1976

[54] APPARATUS FOR REMOVING SULFUR OXIDE FROM EXHAUST GASES

[75] Inventors: Harald Juntgen, Essen-Heisingen; Karl Knoblauch, Essen; Günther Gappa, Gelsenkirchen-Buer; Jürgen Schwarte, Essen-Rellinghausen, all of Germany

[73] Assignee: Bergwerksverband GmbH, Essen, Germany

[22] Filed: Feb. 17, 1972

[21] Appl. No.: 227,100

Related U.S. Application Data

[62] Division of Ser. No. 81,350, Oct. 16, 1970.

[52] U.S. Cl. ............................... 55/390; 23/288 G
[51] Int. Cl.² ..................................... B01D 53/06
[58] Field of Search ................ 55/77, 79, 181, 390, 55/73; 23/288 G; 252/420

[56] References Cited
UNITED STATES PATENTS

| | | | |
|---|---|---|---|
| 1,895,601 | 1/1933 | Beuthner | 55/79 |
| 2,636,575 | 4/1953 | Watson | 55/79 |
| 2,684,729 | 7/1954 | Berg | 55/79 |
| 3,405,508 | 10/1968 | Peters et al. | 55/73 |

*Primary Examiner*—Charles N. Hart
*Attorney, Agent, or Firm*—Michael S. Striker

[57] ABSTRACT

Sulfur oxides are removed from exhaust gases by passage through a moving bed of granular, carbon-containing adsorbent. The bed of adsorbent moves downward through a perforated shaft. The direction of flow of the exhaust gas is transverse to that of the adsorbent. The flow of the gas is adjusted so that more gas passes through the upper portion of the bed than through the lower portion.

9 Claims, 5 Drawing Figures

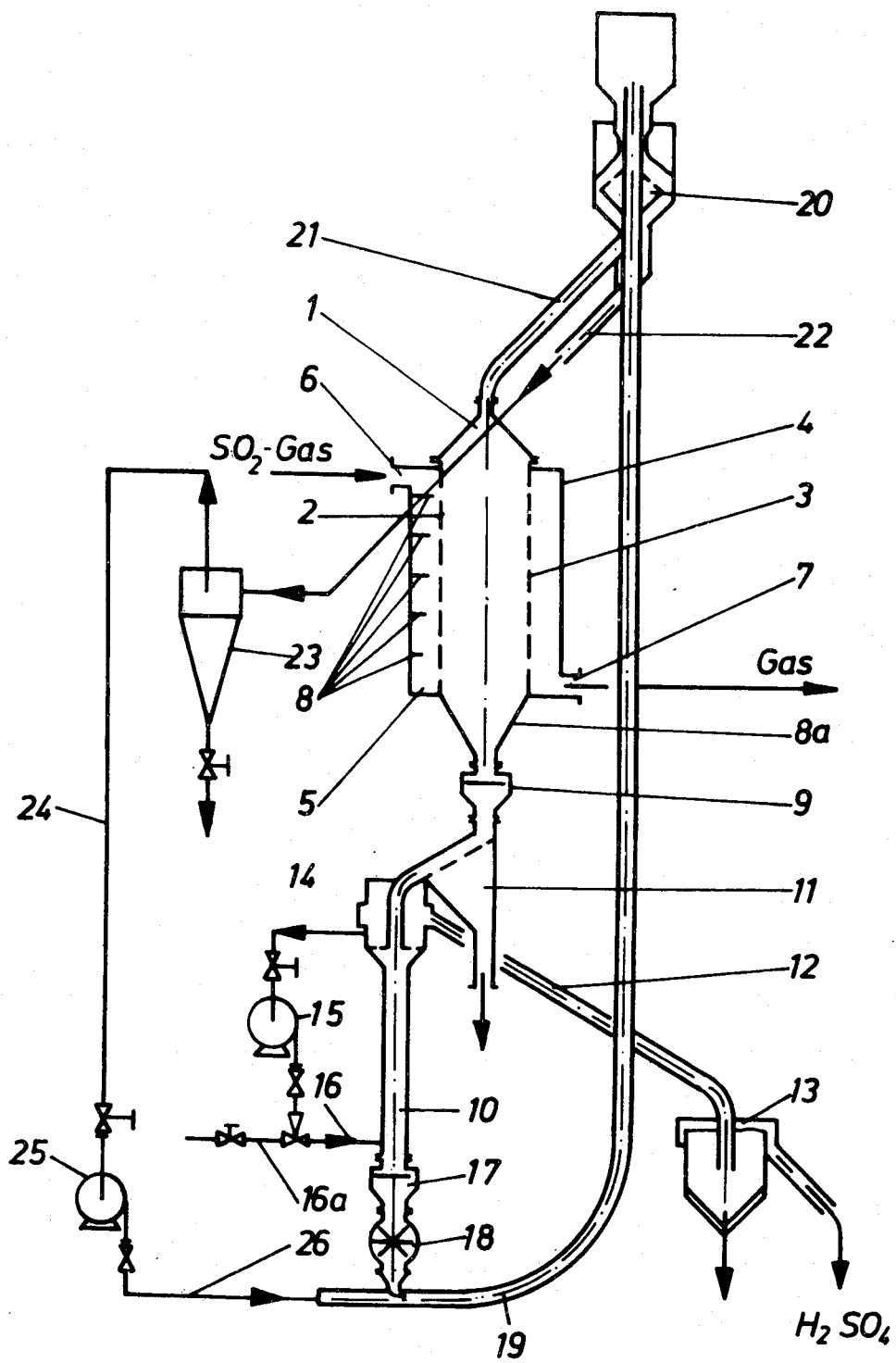
Fig.I

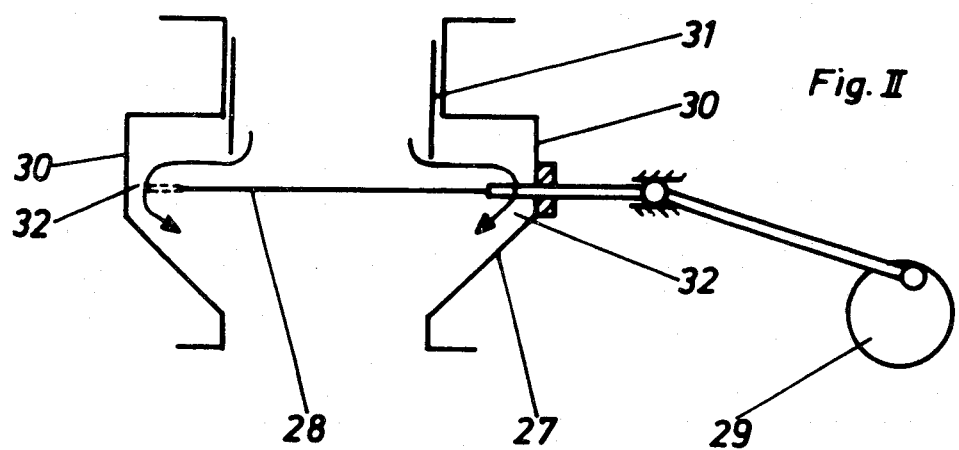
Fig. II
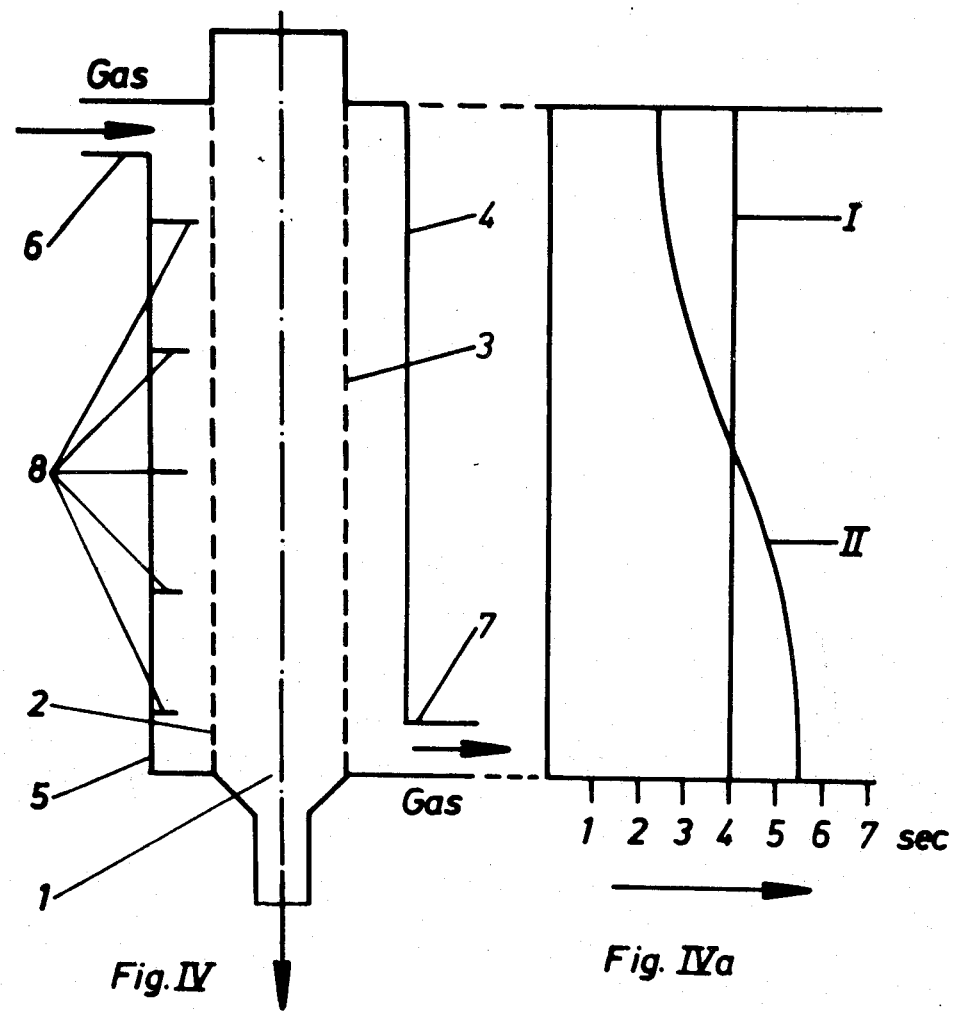
Fig. IV
Fig. IVa

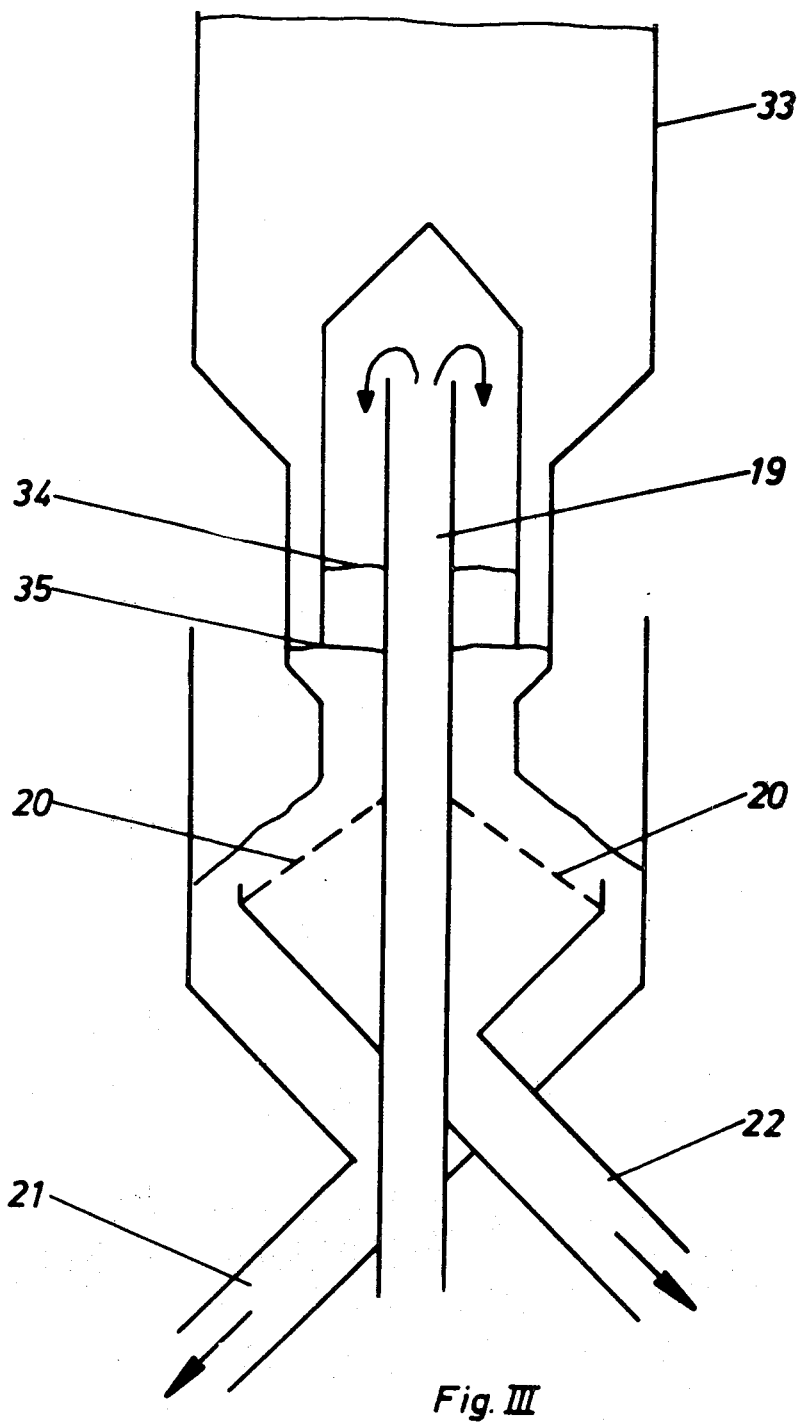
Fig. III

APPARATUS FOR REMOVING SULFUR OXIDE FROM EXHAUST GASES

CROSS-REFERENCE OF RELATED APPLICATIONS

This application is a divisional application of copending application Ser. No. 81,350, filed Oct. 16, 1970, entitled "Process and Apparatus of Removing Sulfur Oxide from Exhaust Gases".

BACKGROUND OF THE INVENTION

Apparatus for the removal of sulfur oxides from exhaust gases by means of adsorption on granular carbon-containing materials and especially cokes and active carbons are known. In such apparatus, the adsorption material moves from above to below either vertically or obliquely in a shaft; at the lower end of the shaft the adsorbent is removed from the system with the aid of an air lock; the exhaust gas then moves transversely to the direction of motion of the moving bed. The adsorption material separates from the system and is freed in known apparatus from the sulfur oxides which are adsorbed in the form of sulfuric acid. The quantity of adsorbent is replenished with fresh material and is then recycled through the adsorber.

SUMMARY OF THE INVENTION

It is an object of the present invention to increase the efficiency of removal of sulfur oxides from exhaust gas.

It is another object of the invention to withdraw sulfuric acid from the adsorbent at an increased concentration.

It is still another object of the invention to provide an apparatus suitable for carrying out the above steps.

It is yet another object of the invention to achieve a high utilization of the adsorption material.

The objects of the present invention are achieved by arranging that exhaust gas containing sulfur dioxide shall traverse a downwardly moving body of adsorbent material under conditions such that a greater portion of the gas passes through the upper portion of the bed than through the lower portion of the bed.

A further advantage results from arranging that the quantity of gas passing through the bed shall vary linearly with the distance from the bottom of the bed.

Although the transverse traversal of a moving bed of adsorbent with an impurity-laden gas is old, the concept of varying the rate of gas flow with the position within the bed results in a number of advantages. For example, in the purification of exhaust gases which contain dust, an additional resistance to the flow of gases through the adsorber can arise as soon as any substantial portion of dust has separated out onto the adsorption material.

In accordance with the present invention, the resistance to transverse flow of the gas through the adsorber can be reduced when the rate at which the adsorbent moves through the bed is greater near that side of the bed at which the gas enters than at the side through which the gas leaves.

At an $SO_2$ concentration in the exhaust gas of more than 3000 ppm, the adsorbent—as will be established later—will have picked up only a small quantity of $SO_2$ before the $SO_2$ appears in the gas leaving the adsorber. This difficulty can be eliminated by separating off a portion of the purified gas, mixing it with fresh untreated gas, and recycling it to the adsorber. Using this technique of decreasing the sulfur dioxide content in the free gas, the adsorber can be charged with a substantially greater quantity of sulfuric acid, despite the fact that the rate of throughput of gas through the adsorber has been substantially increased.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 shows schematically the complete plant for the desulfurization of exhaust gases, in which the regeneration of adsorbent is effected by washing with water;

FIG. 2 shows in detail the mechanical feed hopper which controls the rate of motion of the adsorbent;

FIG. 3 shows the equipment which automatically replenishes the system with fresh adsorber; and FIGS. 4 and 4a shows the form of the flow profile of gases in the adsorber, in accordance with the present invention.

DESCRIPTION OF THE PREFERRED EMBODIMENTS

FIG. 1 shows a complete apparatus with an adsorber, a regeneration portion and a conveyor portion. The adsorption material travels through the shaft 1 from top to bottom. The shaft 1 consists of two opposing walls 2 and 3 each of which is enclosed in its own casing 4 and 5 having the gas inlet and gas outlet 6 and 7. The casing for the gas input to the shaft has within it the inserts 8 which are spaced at appropriate distances along the height of the encasement. By adjustment of the width of the slits between the insert 8 and the perforated wall 2, it is possible to achieve a variety of stream profiles of the gas. The course of the exhaust gases then is through the inlet 6 and the perforated wall 2 where the direction of motion of the gas is perpendicular to that of the adsorbent in the shaft 1, then out through the second perforated wall 3 and the gas outlet 7.

The adsorbent charged with sulfuric acid and dust leaves the shaft 1 through the rate of exit controller 31 and the feed hopper 9 from which it is charged into the washer 10. Before entering the washer 10, the dust is separated from the adsorbent by the sieve 11 which may be, for example, a vibrating filter. The adsorbent traverses the washer 10 from top to bottom and is washed in counter-current by water. The resulting sulfuric acid is taken off at the head of the washer 10 through the conduit 12 to a second chamber 13. As a means of increasing concentration of the resulting sulfuric acid, a portion of the sulfuric acid is taken through line 14, pump 15 and line 16 to be recirculated through the washer with fresh water introduced through the line 16a.

The regenerated adsorbent is removed from the washer through the feed hopper 17 in combination with the radial feeding device 18. The radial feeding device 18 serves to separate the wash and the conveyor return circuits. The adsorbent is carried by means of water through the line 19 to the head of the adsorber. The adsorbent is separated from water by means of the sieve device 20 and then is led back through the line 21 to the shaft 1. The conveyor water passes through the line 22 (symbolized in part by an arrow) to a cyclone 23 in which it is freed from sludge. It is finally returned by means of line 24, pump 25 and line 26 to the conveyor line 19.

FIG. 2 shows the feed hopper 9 in detail. It consists of a horizontal push-plate 28 within an outer housing 27. The push-plate is driven by an eccentric wheel or vibrator 29 back and forth within the walls 30. The adsorbent travels through the hopper 31 which is adjustable in height within the outer housing 27. The flow rate of the adsorbent through the gaps 32 in the direction of the funnel depends on the height at which the hopper 31 is set. It also depends on the displacement of the push-plate as it oscillates to the left and the right. To sum up, the rate of flow of the adsorbent can be controlled by the size of the gaps at the edge of the push-plate, the rapidity with which the push-plate is oscillated and the height of the hopper 31.

Most significantly, the push-plate 28 can be mounted in such a way that it is unsymmetrical with respect to the center line of the feed device; the rates of feed at the two ends of the plate will differ and as a result, the relative rates at which the adsorbent moves through the adsorber across the inlet face and the outlet face of the shaft can be varied.

FIG. 3 shows in detail the apparatus for automatic replenishment of the system with fresh adsorbent. This operates as follows: The adsorbent is conveyed by means of water through the line 19 to the top of the system; at the end of this line the course of the material is turned downward and towards the sieve 20. The sieve separates the adsorbent from the conveyor water; the sieve in this case is a stationary, conical slotted sieve. The conveyor water flows through the conduit 22 into the cyclone separator 23. The regenerated adsorbent reaches the shaft 1 through the line 21. The container 30 serves for automatic replenishment with fresh adsorbent; this occurs as a result of lowering of the material height to the level 35 from the level 34 as a result of which material flows automatically from the container 33 onto the sieve and through the line 21 into the shaft 1, until the level at the line 35 rises to the level of line 34.

FIG. 4 shows schematically the adsorber with the inserts 8 which are adjusted in accordance with the invention to control the distribution of the gas passing through the adsorber. In a specific example, the encasement 5 is 300 millimeters deep and has five rectangular horizontal plates separated from each other by 500 mm. The gaps between the plate edges and the perforated wall are adjustable. A suitable arrangement would be to have the gaps, coming from the top down, be 20 millimeters for the first plate, 40 mm for the second, 60 mm for the third, 80 mm for the fourth, and 100 mm for the fifth. FIG. 4a shows the gas flow rate through the adsorber as a function of height, where the gas flow rate is expressed as the dwell time within the adsorber. In an adsorber without inserts, the dwell time of the gas is constant over the height of the adsorber and could be, for instance 4 seconds as shown by line I. As a result of the inserts 8, the dwell time of the gas at the head of the adsorber is shorter than at the foot, as is shown in line II. In other words, the quantity of gas put through the top of the adsorber per unit of time is greater than that put through the lower portion of the adsorber. By proper choice of the form of the inserts 8 (for instance the inserts could be in the form of perforated plates, or plates with adjustable iris diaphragms) and by means of the distribution of the inserts 8 in the encasement 5, the dwell time of the gas as a function of height within the shaft 1, can be varied in other ways.

EXAMPLE 1

Exhaust gas having a temperature of 140°C and an $SO_2$ concentration of 1000 ppm is introduced at a velocity of 2700 $m^3/h$ into an adsorber which presents a surface area of 3 $m^2$ (height 3 m, width 1 m) and which is 1 m deep. When the gas flow rate is uniform over the height of the adsorber bed, the dwell time of the gas is 4 seconds; with a dwell time of 30 hours for the coke adsorber, the exit $SO_2$ concentration is 200 ppm, a sulfur removal efficiency of 80%.

If the same 2700 $m^3/h$ introduced into the moving bed of adsorbent in such a way that the dwell time is 2.5 seconds at the top of the bed and is 5.5 seconds at the foot, then for a dwell time of 30 hours for the coke adsorbent, the concentration of $SO_2$ in the exit gas is only 100 ppm, which is equivalent to a sulfur removal of efficiency of 90%. As a result, of course, the concentration of sulfuric acid in the coke is raised.

EXAMPLE 2

The adsorber of Example 1 is fed with dust-free flue gas at a rate of 2700 $m^3/h$ so that the dwell time is 4 seconds in all parts of the moving bed adsorber. The adsorber is filled with coke granules with a diameter of 8 millimeters which have a resistance to flow of 50 mm water. When the dust-free flue gas has a dust concentration of 2 $g/m^3$ the adsorber will remove dust down to the point where the exit gas has a dust concentration of 100 $mg/m^3$. Under such conditions the resistance to flow of the gas rises to 120 mm water.

If the flow rate of the coke through the moving bed is changed so that that portion near the gas inlet side has a dwell time 15 hours and the portion near the gas exit side has a dwell time of 25 hours, then the stream resistance for a gas with a similar dust concentration drops from 120 to 90 mm water.

EXAMPLE 3

Using an adsorber built in accordance with the present invention, and having a moving bed volume of 28 l (active charcoal) 5 $m^3/h$ of exhaust gases with an $SO_2$ concentration of 4000 ppm were led therethrough. With an average dwell time for the gas of 20 seconds, traces of $SO_2$ appeared in the exit line 6 after one hour. The loading of the active carbon was 0.4 weight percent of $SO_2$.

In contrast, when three-quarters of the purified gases were recirculated to be mixed with the as-yet unpurified gas and were put through the adsorber with an average dwell time of 5 seconds, traces of $SO_2$ appeared only after 15 hours in the gas exit 7. The charge of $SO_2$ on the active carbon appears to be 6% by weight.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Apparatus for the treatment of exhaust gases containing water vapor, oxygen and sulfur oxide, comprising, in combination, an elongated adsorption vessel having an adsorbent inlet and an adsorbent outlet spaced in the direction of the elongation of said vessel from said adsorbent inlet so as to form between said inlet and said outlet an elongated adsorption zone through which a stream of granular carbon containing adsorbent is adapted to move from said inlet to said outlet; and means for moving exhaust gases containing vapor, oxygen and sulfur oxide transversely through said elongated adsorption zone, said moving means being constructed and arranged in such a manner that in the region of said elongated adsorption zone nearer to said adsorbent inlet each volume unit of said adsorbent stream is traversed by a greater amount of exhaust gases per unit of time than in the region of said adsorbent zone nearer to said adsorbent outlet.

2. Apparatus as defined in claim 1, wherein said adsorption vessel comprises a first and second wall respectively located on opposite sides of said adsorption zone and each extending substantially in the direction of movement of said adsorbent stream, and wherein said means for moving said exhaust gases transversely through said adsorption zone comprise a first outer casing extending along and connected to said first wall, exhaust gas inlet means communicating with said first casing in the region of one end thereof adjacent said adsorbent inlet, a second outer casing extending along and connected to said second wall, exhaust gas outlet means communicating with said second casing adjacent to said adsorbent outlet, and flow restricting means in said first casing for causing a greater amount of exhaust gases per unit of time to pass through the perforations of said first wall which are nearer to said adsorbent inlet than through the perforations of said first wall which are nearer to said adsorbent outlet.

3. Apparatus as defined in claim 2, wherein said flow restricting means comprise a plurality of inserts extending spaced from each other in said direction transversely through said first casing and respectively defining between said first wall and the opposite casing wall flow passages, the areas of which increase from said one to the other end of said first casing.

4. Apparatus as defined in claim 3, wherein the areas of said flow passages are such that the rate of flow of exhaust gases through each volume unit of adsorbent decreases substantially linearly with the distance of each volume unit from said adsorbent inlet.

5. Apparatus as defined in claim 2, wherein said elongated adsorption vessel is upright and said perforated walls extend in substantially vertical direction, and including means at said adsorbent outlet of said vessel for regulating the stream of adsorbent passing through the vessel in such a manner that the portion of said stream closer to said first wall and the portion of the stream closer to said second wall will respectively pass at different speeds through said vessel.

6. Apparatus as defined in claim 5, wherein said regulating means are constructed so that the portion of said stream closer to said first wall will move faster through said vessel than the portion of said stream closer to said second wall.

7. Apparatus as defined in claim 1, wherein said elongated adsorption vessel has a substantially vertical axis and a first and a second perforated wall at opposite sides of said adsorption zone extending substantially in the direction of said axis, and wherein the exhaust gases move from said first to said second of said perforated walls through said adsorption zone, and including means at said adsorbent outlet of said vessel for regulating the stream of the adsorbent therethrough in such a manner that the portion of said stream adjacent one of said walls moves faster through the vessel than the portion of the stream adjacent to the other of said walls.

8. Apparatus as defined in claim 7, wherein said regulating means are constructed such that the portion of said stream adjacent said first wall moves faster through said vessel than the portion of the stream adjacent said second wall.

9. Apparatus for the treatment of exhaust gases containing water vapor, oxygen and sulphur oxide, comprising, in combination, an elongated upright adsorption vessel having an adsorbent inlet at the upper end of said upright vessel and an adsorbent outlet at the lower end thereof so as to form between said inlet and said outlet an elongated adsorption zone through which a stream of granular carbon-containing adsorbent is adapted to move from said inlet to said outlet, said adsorption vessel comprising a first and a second perforated upright wall located at opposite sides of said adsorption zone; means for moving said exhaust gases transversely through said adsorption zone and comprising a first outer casing extending along and connected to said first wall, exhaust gas inlet means communicating with said first casing in the region of one end thereof adjacent said adsorbent inlet, a second outer casing extending along and connected to said second wall, exhaust gas outlet means communicating with said second casing adjacent said adsorbent outlet, flow restricting means in said first casing for causing a greater amount of exhaust gases per time unit to pass through the perforations of said first wall which are nearer to said adsorbent inlet than through the perforations of said first wall which are nearer to said adsorbent outlet; and means at said adsorbent outlet for regulating the stream of adsorbent passing through said vessel in such a manner that the portion of the stream closer to said first wall and the portion of said stream closer to said second wall will pass, respectively, at different speeds through said vessel, said regulating means comprising a hopper downstream of said adsorbent outlet of said vessel and aligned along a common substantially vertical axis therewith, a plate extending in said hopper substantially normal to said axis and asymmetrically with respect thereto to define between opposite end edges of said plate and said hopper passages of different areas, and means for reciprocating said plate in a direction substantially normal to said end edges thereof.

* * * * *